United States Patent [19]

Takahashi

[11] Patent Number: 4,803,891

[45] Date of Patent: Feb. 14, 1989

[54] TRANSMISSION FOR CONTROLLED EQUIPMENT

[76] Inventor: Takashi Takahashi, 26-18, Kamisoshigaya 1, Setagaya-ku, Tokyo, Japan

[21] Appl. No.: 67,056

[22] Filed: Jun. 29, 1987

[30] Foreign Application Priority Data

Mar. 12, 1987 [JP] Japan .................... 62-55293

[51] Int. Cl.$^4$ .......................................... F16H 55/18
[52] U.S. Cl. ........................................ 74/409; 74/440; 74/447
[58] Field of Search ................ 74/409, 410, 447, 397, 74/396, 440; 403/370

[56] References Cited

U.S. PATENT DOCUMENTS

| | | | |
|---|---|---|---|
| 2,737,056 | 3/1956 | Baumgartner | 74/409 |
| 3,365,723 | 1/1968 | Spormann | 74/409 X |
| 3,397,590 | 8/1968 | Prentice | 74/409 |
| 3,405,580 | 10/1968 | Hallden | 74/409 X |
| 3,657,940 | 4/1972 | Wagner | 74/409 X |
| 3,704,449 | 11/1972 | Hutchins | 74/409 X |
| 3,803,936 | 10/1972 | Kroeper | 74/409 |
| 3,847,495 | 11/1974 | Peter et al. | 403/370 |
| 3,889,549 | 6/1975 | Fieuzal et al. | 74/409 |
| 3,945,258 | 3/1976 | Nakaya | 74/409 X |
| 4,354,769 | 10/1982 | Peter | 403/370 X |

FOREIGN PATENT DOCUMENTS

| | | | |
|---|---|---|---|
| 2520828 | 8/1983 | France | 74/409 |
| 0126166 | 7/1984 | Japan | 74/409 |
| 0641213 | 1/1979 | U.S.S.R. | 74/409 |

Primary Examiner—Dirk Wright
Assistant Examiner—Harold F. Macris
Attorney, Agent, or Firm—Armstrong, Nikaido, Marmelstein & Kubovcik

[57] ABSTRACT

A transmission for controlled equipment consists of a pair of intermediate gears in mesh with an input gear, another pair of intermediate gears in mesh with an output shaft and a pair of intermediate shafts, each connecting one of the intermediate gears engaged with the input gear and one of the intermediate gears engaged with the output gear, thus forming a pair of gear trains, wherein one of the intermediate gears is loosely mounted on one of the intermediate shafts and is also made fixable by a fixing means, the intermediate shaft and the intermediate gear in the loosely coupled condition are slightly turned in opposite directions so that the gear train made up of the input gear, the intermediate gears on one side and the output gear and the other gear train made up of the input gear, the intermediate gears on the other side and the output gear have no backlash between the gear teeth surfaces of the input gear and the intermediate gears with respect to the power driving directions which are opposite for the two gear trains, and then in that gear engagement condition the intermediate gear loosely mounted on the intermediate shaft is securely fixed to the intermediate shaft by the fixing means.

2 Claims, 4 Drawing Sheets

TRANSMISSION FOR CONTROLLED EQUIPMENT

BACKGROUND OF THE INVENTION

The present invention relates to a transmission apparatus used in controlled equipment such as industrial robots which can reverse the rotating direction during operation.

In the controlled equipment such as industrial robots, the power shaft is not driven in one direction only but its rotating direction is reversed during operation. The gears in the transmission apparatus incorporated in such controlled equipment always have backlash and the existence of the backlash delays the reversing action of the output shaft to the extent corresponding to the backlash, resulting in the power transmission becoming inaccurate. This problem has long been pointed out in the industry.

To eliminate such power transmission inaccuracy due to backlash, it has been proposed that two gears are put together with their phases shifted to such an extent corresponding to the backlash to make these two gears engage with a mating gear without any backlash. However, the backlash is produced partly by an unavoidable machining error and, considering the limit in improving the machining accuracy, it is extremely difficult to shift the two gears' phases exactly corresponding to such a minute backlash and fix them to the shaft.

Furthermore, the above double gear mechanism cannot avoid a wedge effect inherent to the two teeth engagement structure, making a smooth operation of the transmission difficult.

SUMMARY OF THE INVENTION

The object of this invention is to provide a transmission for controlled equipment which can reverse the rotating direction of a power transmitting shaft by utilizing gear trains.

Another object of this invention is to provide a transmission for controlled equipment which can transmit power accurately and smoothly with virtually no backlash.

To achieve the above objectives, this invention utilizes gear trains which consist of a pair of intermediate gears in mesh with an input gear, another pair of intermediate gears in mesh with an output gear, and a pair of intermediate shafts each connecting one of the intermediate gears in mesh with the input gear and one of the intermediate gears in mesh with the output gear. In the gear trains, one of the intermediate gears is loosely mounted on the intermediate shaft so that it can be turned through an arbitrary angle. The loosely mounted intermediate gear is made fixable to the intermediate shaft by a fixing means at a desired angle. The intermediate shaft and the intermediate gear in the loosely mounted condition are slightly turned in opposite directions so that the input gear has no backlash, in the power transmitting directions, with the gear train made up of the input gear, intermediate gears on one side and output gear and also with the other gear train made up of the input gear, intermediate gears on the other side and output gear, the power transmitting directions being opposite for the two gear trains. In this engagement condition with no backlash, the loosely mounted intermediate gear is securely fixed to the intermediate shaft by the fixing means.

This structure enables quick reversing of the rotating direction of the power output shaft without producing a time lag due to the backlash when the input shaft changes its rotating direction and also makes the gear rotation during operation smooth.

In a preferred embodiment of the transmission for controlled equipment, it is preferable that the output gear and a pair of intermediate gears in mesh with the output gear be installed inside the casing and the input gear and a pair of intermediate gears in mesh with the input gear be installed outside the casing. By putting outside the casing the input gear and the pair of intermediate gears meshing with the input gear, it is possible to make the end of the intermediate shaft project outwardly from the casing so that the intermediate shaft end can be manually turned. This facilitates the adjusting operation to set the two gear trains in such a way that the input gear has no backlash with the two gears trains in the power transmitting directions which are opposite for the two gear trains.

It is also preferred that the input gear and its intermediate gears installed outside the casing are enclosed by a cover which is fixed by means of a bridge member projecting outwardly from the casing and that the cover is provided with an adjust hole facing the end of the intermediate shaft.

DETAILED DESCRIPTION OF THE PREFERRED EMBODIMENT

Figure 1:
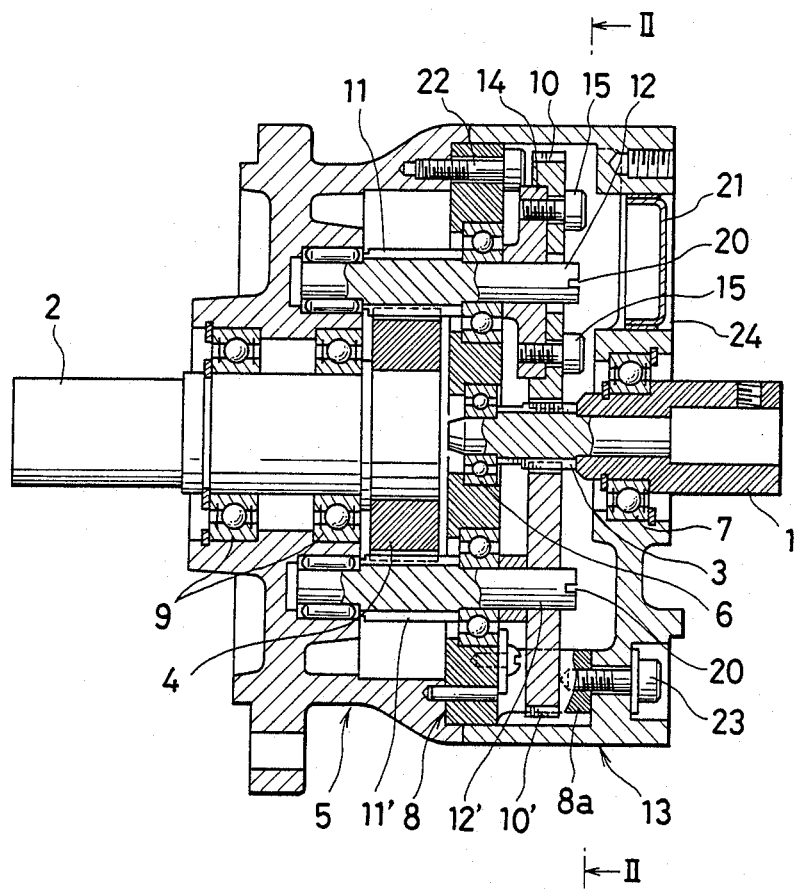
FIG. 1 is a longitudinal cross section of the transmission of the preferred embodiment of this invention.
Figure 2:
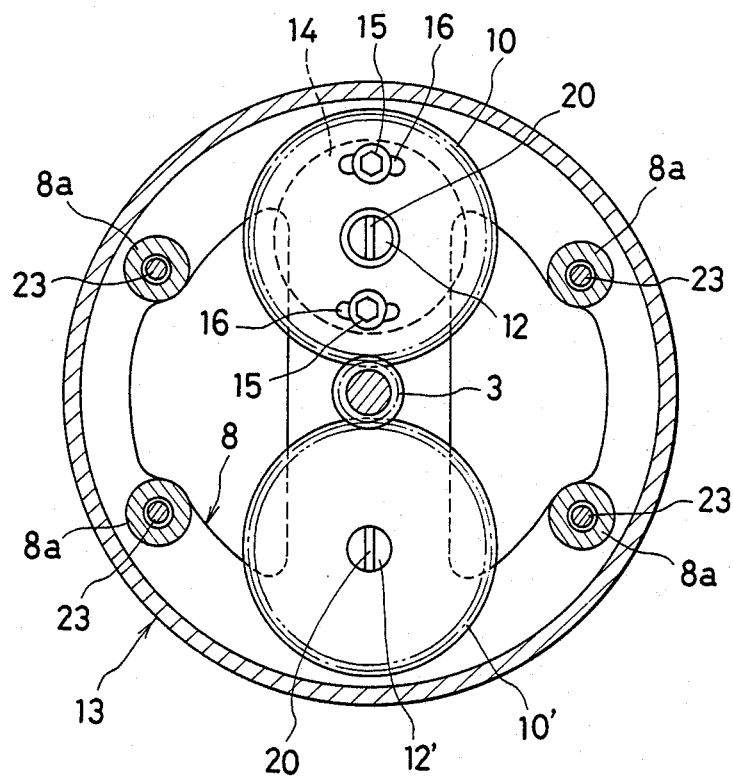
FIG. 2 is a cross section taken along the line II—II of FIG. 1 and seen from the arrow.

FIGS. 1 and 2 show the transmission for controlled equipment as an embodiment of this invention. Denoted 1 is an input shaft that rotates at high speeds and 2 is an output shaft which derives power from the input shaft with the rotating speed reduced. The input shaft 1 is secured with an input gear 3 and the output shaft 2 with an output gear 4. A casing 5 has an open end and a support member 8 is secured to the open end by bolts 22. Inside the casing 5 are installed the output shaft 2 and the output gear 4 which is supported by bearings 9, 9. The input shaft 1 and the input gear 3 are installed outside the casing 5 with respect to the support member 8 to facilitate the adjusting operation for removing a backlash which will be described later.

The casing 5 has a cover 13 attached from outside which encloses the input shaft 1 and the input gear 3. The cover 13 is removable from the casing 5 by means of bolts 23 which are screwed into bridge members 8a projecting outwardly from the support member 8. The input shaft 1 is supported at the intermediate portion by a bearing 7 on the cover 13 and, at the front end, is supported by a bearing 6 on the support member 8. The cover 13 has an adjust hole 24 through which a tool is inserted for backlash adjustment. The adjust hole 24 is attached with a removable blank cover 21.

The input gear 3 installed outside the casing 5 is in mesh with a pair of intermediate gears 10, 10'. The output gear 4 installed inside the casing 5 is in mesh with another pair of intermediate gears 11, 11'. The opposing intermediate gears 10 and 11 are connected with each other by an intermediate shaft 12, and another set of opposing intermediate gear 10' and 11' are connected with each other by an intermediate shaft 12'. Of these, the intermediate gears 11, 10' and 11' are securely mounted on the intermediate shafts 12, 12' by shrinkage fit while only the remaining intermediate gear 10 is loosely and rotatably mounted on the intermediate shaft 12 and is secured by bolts 15 to a disk 14 which is rigidly secured to the intermediate shaft 12 by shrinkage fit.

The bolts 15 pass through through-holes 16 formed in the intermediate gear 10 and screw into the disk 14. The through-hole 16 is shaped as an arc slit extending in the circumferential direction. This arc slit allows relative rotation of the intermediate gear 10 and the intermediate shaft 12 when the bolts 15 are loosened. The through-hole 16 need not necessarily be a slit and may be a large circular hole slightly larger in diameter than the bolt 15 to permit relative rotation between the intermediate gear 10 and the intermediate shaft 12.

Figure 5:
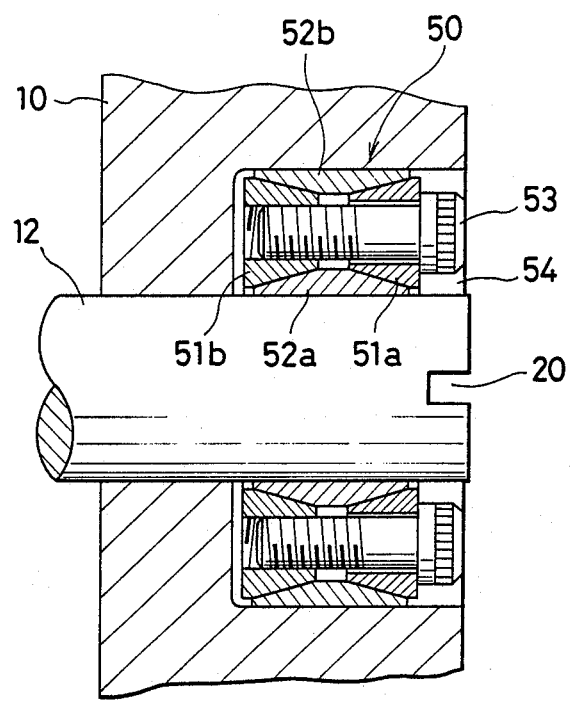
FIG. 5 is a partial cross section of the transmission showing an example of fixing means to fix the intermediate gear to the intermediate shaft, mounted between an intermediate gear and an intermediate shaft.

The means to couple together the loosely mounted intermediate gear 10 and the intermediate shaft 12 is not restricted to the above mechanism consisting of the disk and the bolts, and may be a span ring 50 as shown in FIG. 5. The span ring 50 consists of tapered rings 51a, 51b, and inner race 52a and outer race 52b between which the tapered rings are installed, and bolts 53 which pass through one tapered ring 51a and screw into the other tapered ring 51b.

The span ring 50 is placed in a recessed portion 54 formed in the axial part of the intermediate gear 10. When the bolts 53 are loosened, the intermediate gear 10 can freely rotate on the intermediate shaft 12. But when the bolts 53 are tightened, the rings 51a, 51b are drawn toward each other pressing through the tapered surface the inner race 52a against the intermediate shaft 12 and the outer race 5b against the inner circumferential surface of the recessed part 54 of the intermediate gear 10, thereby bringing the intermediate gear 10 and the intermediate shaft 12 into secure engagement.

Figure 4:
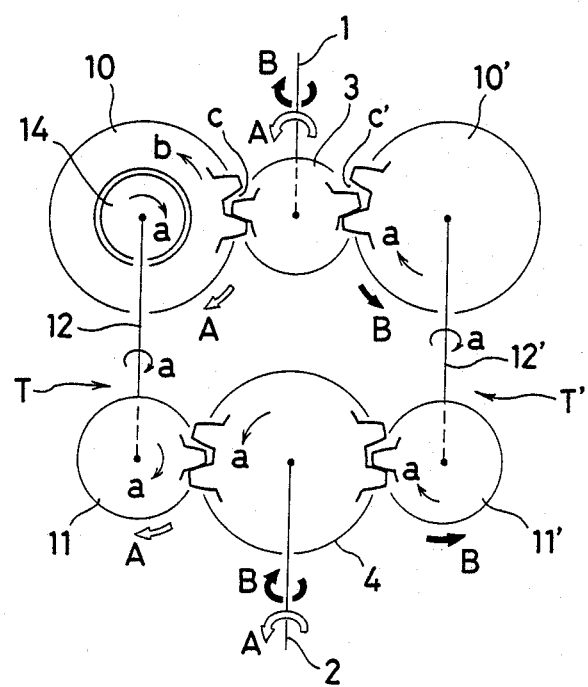
FIG. 4 is an operating principle diagram showing the relationship between the gears of the transmission in meshing engagement.

When the above-mentioned transmission is incorporated into the power transmission system of a controlled equipment such as industrial robots, the gear backlash is removed as shown in FIG. 4 before putting the transmission into service.

Figure 3:
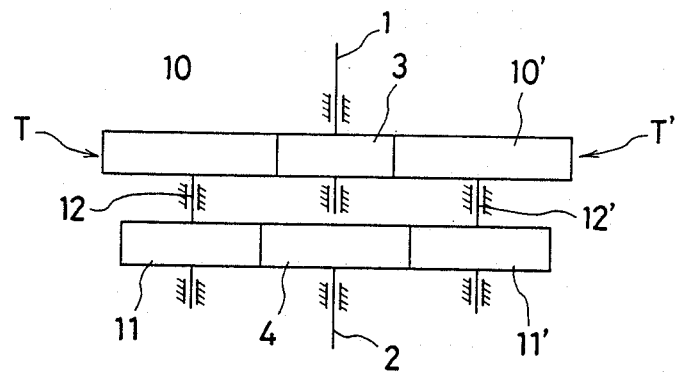
FIG. 3 a simplified schematic diagram showing the power transmission system of this invention.

The above transmission, as shown in FIG. 3, consists of a gear train T that transmits power from the input shaft 1 to the input gear 3, intermediate gear 10, intermediate shaft 12, intermediate gear 11 and to the output gear 4 and another gear train T' that transmits power from the input shaft 1 to the input gear 3, intermediate gear 10', intermediate shaft 12', intermediate gear 11' and to the output gear 4.

In such an apparatus having these gear trains, the blank cover 21 is removed from the cover 13 to insert a tool through the adjust hole 24 and loosen the bolts 15 (in the case of FIGS. 1 and 2) or bolts 53 (in the case of FIG. 5). Then the intermediate shaft 12 is turned in the direction of arrow a of FIG. 4 by using an engagement slot 20 at the shaft end. The rotation of the intermediate shaft 12 is conveyed to the intermediate gear 11, output gear 4, intermediate gear 11', intermediate gear 10' and to the input gear 3 in that order, so that the gear teeth contact condition of the gears in mesh with one another will be as shown in FIG. 4.

Next, the input shaft 1 is locked and the intermediate gear 10 is slightly turned in the direction of arrow b opposite to the arrow a until the gear 10 stops, setting the gear teeth contact condition as shown in FIG. 4. Then the bolts 15 (in the case of FIGS. 1 and 2) or bolts 53 (in the case of FIG. 5) are fastened to securely connect the intermediate gear 10 and the intermediate shaft 12 together.

In the gear trains with the above setting, one gear train T has a meshing relationship of the gears such that the power is transmitted through gear train when the input shaft 1 is rotated in the counterclockwise direction, A (arrow), input shaft 1, FIG. 4), whereas the other gear train T' has a meshing relationship that transmits power when the input shaft 1 is rotated in the clockwise direction (arrow B, input shaft 1, FIG. 4). Thus, when the input shaft 1 is turned in the direction A, the power is transmitted through the gear train T to the output shaft 2, but not through the other gear train T'. In other words, the teeth engagement between the intermediate gear 10' and in the train T' and input gear 3 on input shaft 1 is such that there is a gap c' between the teeth with respect to the power when input shaft 1 and input gear 3 are rotated counterclockwise and power is transmitted through gear train T. Thus, power is not transmitted through gear train T' and the intermediate gear 10' simply rotates following the input gear 3 with the teeth surfaces of gears 10' and 3 in engagement opposite to the power transmission direction.

On the other hand, when the input shaft 1 is turned in clockwise direction B, power is transmitted through gear train T' to output shaft 2, but power is transmitted through gear train T. Thus, the gear teeth engagement between the teeth of intermediate gear 10 and input gear 3 is such that there is a gap c between the teeth of gears 10 and 3 in the power transmission direction. Power is not transmitted through gear 10 when input shaft 1 and input gear 3 are rotated clockwise in the direction of arrow B, shaft 1. Intermediate gear 10 simply rotates and follows the input gear 3 with the teeth surfaces of gears 3 and 10 in contact opposite to the power transmission surface of such gears.

Since the gear train that is not transmitting power rotates to follow the input gear with the gear teeth in contact and is in idle, when the rotation of the input shaft is reversed from the direction A to the direction B or vice versa, the gear train which was idling immediately starts transmitting power and is reversed the turning direction of the output shaft with virtually no backlash. This means that there is no delay in the reversal of direction that might otherwise occur due to the backlash and an accurate power transmission is assured.

In the conventional double gear teeth engagement structure or double gear structure, the geometrical error such as teeth shape error and pitch error cannot be absorbed and a wedge effect results, making the smooth power transmission impossible. However, with the transmission of this invention with the above structure, the power transmitting gear train has a gap (or backlash) between the teeth surfaces, on the side opposite to the power transmission direction, of the intermediate gear and the input gear, and the inclination of gear teeth of the power carrying train as it is driven by the input gear is transmitted to the other idling gear train to enable a smooth teeth contact between the idling gear and the input gear. This absorbs the geometric error of the gears realizing a very smooth operation of the transmission.

Although the above embodiment dealt with the speed reducer or reduction gear apparatus, it is also possible to apply the invention to an overdrive gear apparatus by using the input shaft as an output shaft and the output shaft as an input shaft.

As described in the foregoing, the transmission of this invention can reverse the rotation direction without a delay that might otherwise occur due to the backlash and enables a smooth power transition.

I claim:

1. A reversible transmission for controlled equipment comprising: a pair of intermediate gears in mesh with an input gear; another pair of intermediate gears in mesh with an output gear; and a pair of intermediate shafts, each connecting one of the intermediate gears engaged with the input gear with one of the intermediate gears engaged with the output gear, thus forming a pair of gear trains, one of said pair of gear trains transmitting power from said input gear to said output gear when said input gear is driven in a first power transmission direction and the other of said pair of gear trains transmitting power from said input gear to said output gear when said input gear is driven in an opposite power transmission direction, said power transmission direction being reversible without backlash between said gears, one intermediate gear of one of said pair of intermediate gears being adjustably mounted on one of said pair of intermediate shafts and being securely fixable to said one of said pair of intermediate shafts by a secure fixing means, said adjustably mounted intermediate gear being slightly turnable in opposite directions on said one intermediate shaft to take-up any backlash between said gears in one of said pair of gear trains in said first power transmission direction and between said gears in the other of said pair of gear trains in said opposite power transmission direction, said adjustably mounted intermediate gear being securely fixed to said one intermediate shaft with said secure fixing means when said backlash is taken-up in one of said power transmission directions and securely fixing said adjustably mounted intermediate gear to said one intermediate shaft for eliminating backlash in both of said power transmission directions, said secure fixing means comprising bolts passing through through-holes formed in said adjustably mounted intermediate gear with a gap between said bolts and inner surfaces of said through-holes and a disk secured to said intermediate shaft, said adjustably mounted intermediate gear being securely fixed to said disk when said bolts are tightened.

2. A transmission for controlled equipment as set forth in claim 1, wherein the output gear and the pair of intermediate gears in mesh with the output gear are installed inside a casing, the input gear and the pair of intermediate gears in mesh with the input gear are installed outside said casing, the input gear and its meshing intermediate gear are enclosed by a cover fixed to said casing, said cover supports said input shaft on which said input gear is mounted and has an adjust hole facing the end of said adjustably mounted one of said pair of intermediate gears.

* * * * *